Oct. 16, 1951     A. G. E. LEUFVEN     2,571,265

HYDRAULIC TENSIONING NUT

Filed June 7, 1946

Inventor:
Axel Gustav Edvard Leufvén
by his Attorneys
Howson & Howson

Patented Oct. 16, 1951

2,571,265

UNITED STATES PATENT OFFICE 2,571,265

HYDRAULIC TENSIONING NUT

Axel Gustav Edvard Leufvén, Goteborg, Sweden

Application June 7, 1946, Serial No. 675,134
In Sweden June 13, 1945

1 Claim. (Cl. 85—32)

The present invention relates to a device for facilitating the tightening or unscrewing of nuts on bolts or the like, especially large heavily loaded nuts. The invention is characterized mainly by means for unloading the nut and for simultaneously therewith subjecting the bolt to a tensile force.

Figure 1:
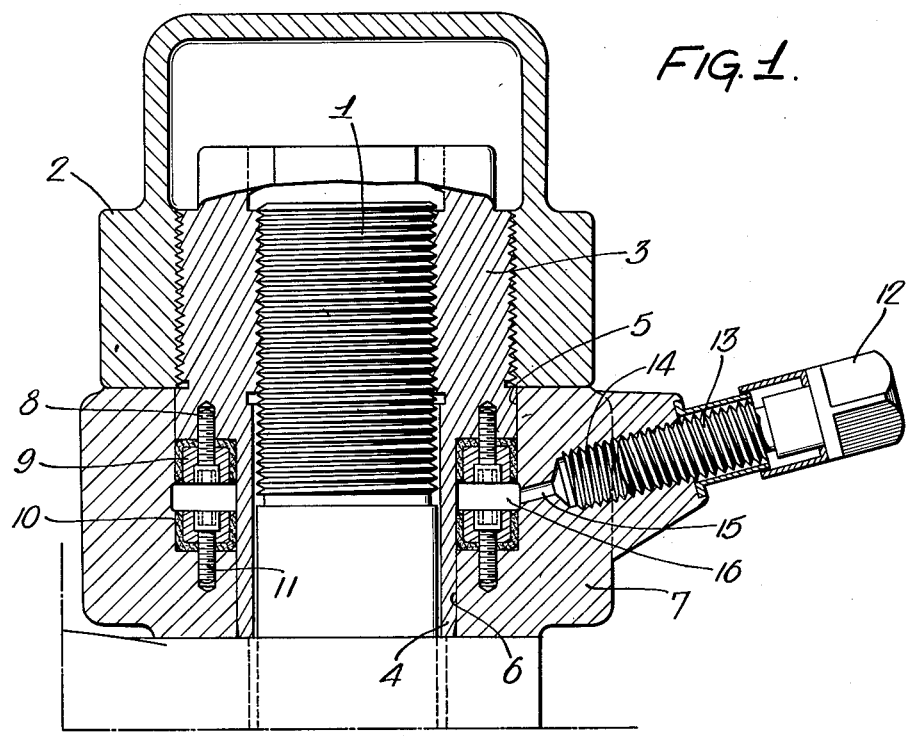
Figure 2:
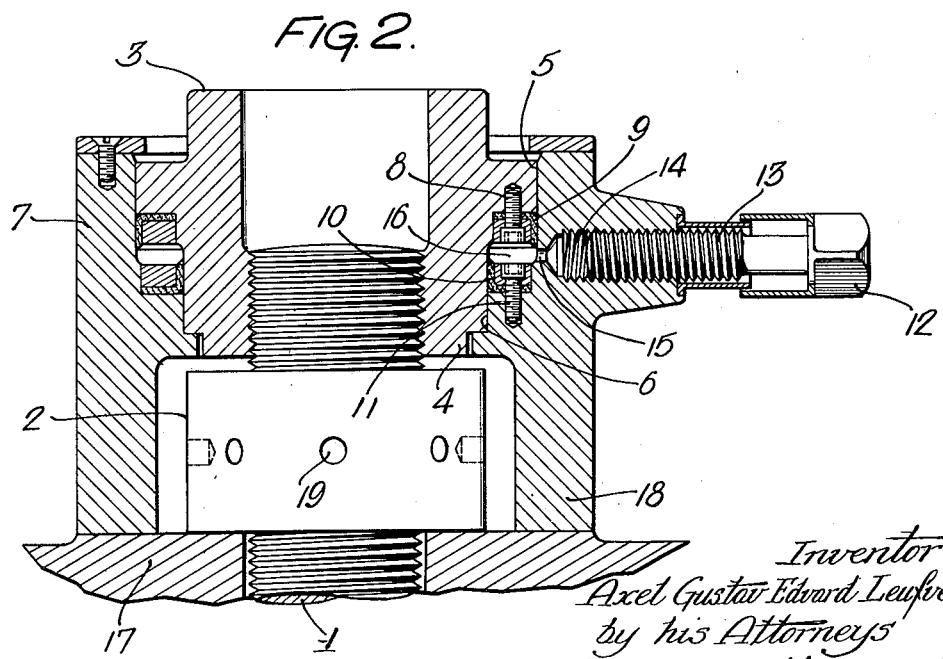

Two embodiments of the invention are illustrated in the accompanying drawings in which Fig. 1 shows an embodiment in which the nut is superimposed upon the loading means and Fig. 2 shows an embodiment in which the nut is arranged under removable loading means.

In the embodiment illustrated in Fig. 1 the numeral 1 designates the bolt and 2 is a nut in threaded engagement with the bolt, for instance for bolting together a pair of machine parts, which may be parts of a rolling mill or the like. Interposed between the bolt 1 and the nut 2 is an annular member 3, in the following called the piston and which internally is in threaded engagement with the bolt 1 and externally is in threaded engagement with the nut 2. The piston 3 has a thinner annular extension 4 and its cylindrical surfaces 5 and 6 serve to guide it in corresponding cylindrical surfaces in another annular member 7, in the following designated the cylinder. A sealing ring 9 is attached to the piston 3 by means of screws 8 and is so formed that it seals against the internal cylindrical surface 5 and also against the external cylindrical surface 6 of the extension 4. Another seal 10 is disposed in the cylinder 7 and is fixed to the cylinder by means of screws 11 and also seals against both of the above mentioned surfaces 5 and 6.

A pressure generating member is attached to the cylinder 7 and as shown comprises a screw 13 with a squarehead 12 and having fine threads accurately fitting a threaded hole 14 from which a channel 15 leads to an annular chamber 16 formed between the members 4 and 7.

When the parts are relatively large and the bolt is to be subjected to a considerable load (some tens of tons) very great forces are required to tighten the nut 2 in the ordinary manner. According to the invention however the tightening operation is facilitated in the following manner. The annular chamber 16, the channel 15 and the hole 14 are filled with a suitable, not too fluid, pressure transmitting medium for instance paraffin or the like, after which the screw 13 is inserted in the hole 14 and the piston 3 is screwed on to the bolt 1 so that it assumes the position shown in the figure. The pressure transmitting fluid then completely fills the spaces mentioned.

When the screw 13 is tightened by means of a suitable tool applied to the head 12 the pressure medium is subjected to a very considerable pressure and the piston 3 is consequently forced upwards in the figure, thereby subjecting the bolt 1 to tensile stress. The pressure should be somewhat greater than the desired permanent stress in the bolt because of the give which takes place when the load is transferred to the nut. The nut 2, which has been previously screwed onto the external threads of the piston 3 so as to be in engagement with the cylinder 7, takes part in the movement of the piston and consequently loses contact with the cylinder 7. The nut can now be tightened in a suitable manner until it is again in engagement with the cylinder, after which the screw 13 can be retracted somewhat so that the pressure in the pressure medium is released and the nut 2 carries the load. In some cases it may be necessary to repeat the process one or more times. The nut 2 should be tightened before each repetition to take up the slack which occurs between the nut and the cylinder 7, until the desired load is obtained in the bolt 1.

In the embodiment shown in Fig. 2 corresponding parts have been numbered as in Fig. 1. No further description of these parts or their function is therefore required. The main difference between the embodiments is that while in Fig. 1 the nut 2 is supported by the cylinder 7 it may in Fig. 2 act directly on one of the machine parts 17. The piston 3 is screwed onto a part of the bolt projecting above the nut and the cylinder is provided with a number of supporting legs 18 arranged on a diameter greater than the diameter of the nut and adapted to abut against the member 17, or some other suitable member, and support the cylinder in operative position relative to the piston. Between the legs 18 are openings through which a suitable tool can be inserted to engage with holes 19 in the nut for turning the same. The bolt is loaded in the manner described in connection with Fig. 1 and the nut is then tightened. When this has been done the piston is released and can then be removed together with the cylinder. The device can then be used in connection with another bolt. It is therefore unnecessary to have a separate device for each bolt, which is especially desirable when a number of similar bolts are to be tightened as is the case for instance with foundation bolts or the like.

The device has been described above as used for tightening a bolt, but may of course be equally used to decrease the friction between the nut and the supporting member when removing a nut.

Constructional details may of course be varied without departing from the spirit of the invention. The device for loading the bolt may thus be mechanically instead of hydraulically operated. The cylinder may engage the bolt instead of the piston. The same pressure generating tool may be connected to a plurality of bolts the nuts of which are to be simultaneously tightened. Having thus described my invention, I claim and desire to secure by Letters Patent the following:

In a device for facilitating the tightening of nuts on work-retaining bolts, a unitary cylindrical structure adapted to embrace the threaded end of the bolt and comprising axially relatively movable elements, and means for applying pressure to relatively move said elements to expand the structure, one of said elements being arranged for reaction with the said work and having a seat for the nut, and the other of said elements having internal threads for attachment to the bolt independently of the nut and external threads for reception of the nut and on which the nut may be turned down upon the said seat.

AXEL GUSTAV EDVARD LEUFVÉN.

REFERENCES CITED

The following references are of record in the file of this patent:

UNITED STATES PATENTS

| Number | Name | Date |
| --- | --- | --- |
| 828,468 | Fince et al. | Aug. 14, 1906 |
| 1,304,895 | McBride | May 27, 1919 |
| 1,387,895 | McBride | Aug. 16, 1921 |
| 1,479,712 | Hallett | Jan. 1, 1924 |
| 1,497,218 | McBride | June 10, 1924 |
| 1,572,073 | Murphy | Feb. 9, 1926 |
| 1,974,148 | Byerlein | Sept. 18, 1934 |